May 2, 1933.  E. I. McGEE  1,906,277
VALVE
Filed Aug. 6, 1929  2 Sheets-Sheet 1

INVENTOR
Edgar I. McGee,
By Byrnes, Stebbins & Parmelee,
His attorneys.

May 2, 1933.  E. I. McGEE  1,906,277
VALVE
Filed Aug. 6, 1929  2 Sheets-Sheet 2

INVENTOR
Edgar I. McGee,
By Byrnes, Stebbins & Parmelee
His attorneys

UNITED STATES PATENT OFFICE

EDGAR I. McGEE, OF CONNELLSVILLE, PENNSYLVANIA, ASSIGNOR, BY MESNE ASSIGNMENTS, TO ALEX. J. JOHNSTON, OF BUTTE, MONTANA

VALVE

Application filed August 6, 1929. Serial No. 383,797.

My invention relates to valves, and more particularly to suction control valves.

In gathering liquids from different locations, and particularly in mines where water gathers at different levels, it is customary to provide a plurality of collecting pools or sumps at different locations. For economy and convenience, a single pump is usually provided for drawing the liquid from the different pools or sumps. The rate at which the liquid collects in the different pools varies, and the rate at which the liquid is pumped from the different pools varies in accordance with their elevations relative to the pump and in accordance with the frictional resistance offered by the pipe lines connecting the pools to the pump. In general, the pools at the higher elevations and nearest to the pump are emptied first as the pump exerts the greatest effective suction therein. As soon as the liquid level in any pool drops below the mouth of the pipe leading thereto, air enters the pump system. In case several branch pipes are connected to one central suction line, the admission of air at any branch destroys the condition of vacuum in the whole system.

The highest and closest pools are emptied frequently, while the more distant and lower pools are not effectively drained.

Heretofore where deep pools or sumps are provided, valves entirely submerged in liquid have been used to close the pipe when the liquid level in the pool or sump drops to a predetermined level. In other instances, hand operated valves have been used to shut off the different branch lines. For many installations it is not practicable to provide deep pools or sumps at all positions.

Where hand operated valves are utilized, it is necessary for an attendant to make a tour of the valves periodically for adjusting them. In many installations, particularly in mines where the pipe lines are frequently covered by falls of earth, difficulty is experienced by an attendant in reaching all of the valves. Also, the attendant may not reach a particular valve until the system has pumped a considerable amount of air.

I provide a suction control valve opened and closed by the suction applied thereto in accordance with the movement of liquid thereto. When the flow of liquid to the valve is interrupted and air is admitted to the valve, it closes, and again opens when fluid is supplied thereto. The valve is operable at any position in the pipe line, and may be disposed at any convenient place between the pump and the cooperating pool or sump.

As such valves are subjected to different degrees of suction in accordance with their distances from, and/or relative elevations to, the connected pump, they are subjected to considerable ranges of pressure differentials, and must operate equally well in their different positions. The absolute pull of the valve in breaking a vacuum during an opening operation may be considerable, and varies in accordance with the area of the valve and valve seat therein. In order to secure the correct operation of the valves under such conditions without employing exorbitantly large floats or complicated systems of lever mechanisms, the pressure on the opposite sides of a float chamber is equalized so that a float is only called upon to lift substantially the weight of the valve, after which the inrushing liquid is utilized for overcoming the tendency of the vacuum applied to the valve and the force of the liquid being drawn from the valve, to close it.

Provision is made for subjecting the valve to pump suction at all times for maintaining a float chamber under a condition of suction. Upon the admission of air to the float chamber, the float is lowered for closing the valve. As a condition of partial vacuum exists after the valve is closed, a leakage path is provided from the connected supply line. With this construction, as soon as the pipe line is filled with liquid, a portion of it is drawn into the float chamber for raising the float and connected valve. An arrangement of valves and valve seats is provided by means of which the incoming liquid assists in raising the float.

The accompanying drawings illustrate a present preferred embodiment of the invention, in which:—

Figure 1:
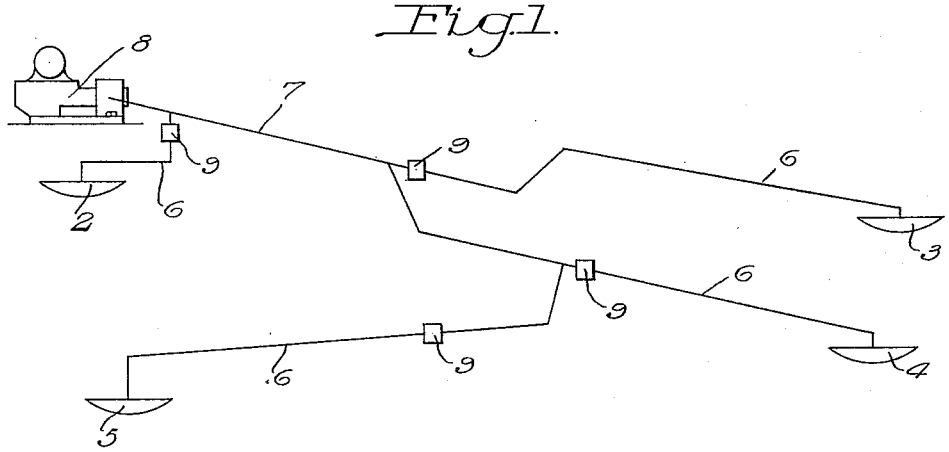
Figure 1 is a diagrammatic view of a pumping system embodying my invention.

Referring to Figure 1, a plurality of pools or sumps 2, 3, 4, and 5 which may be relatively shallow, are disposed at different points and elevations for the collection of liquid. Some of the pools or sumps may be disposed at relatively inaccessible places, such as isolated mine entries and the like. The several pools or sumps are connected by branch pipe lines 6 to a main suction line 7, leading to a pump 8. Each of the branch lines 6 is provided with a suction control valve 9 embodying my invention. Each of the valves 9 serves to interrupt communication between the suction line 7 and their respective cooperating pools when the liquid level in the cooperating pools becomes low enough to admit air into the system. The pump 8 may be of any preferred type.

The several valves 9 are disposed at any accessible place in the piping system so that they may easily be inspected by an attendant without requiring the attendant to visit the several remotely disposed pools 2, 3, 4 and 5.

In general, the pool 2 will be drained first owing to the fact that it is at the highest elevation and the shortest distance from the pump 8. The pool 5 being at the lowest elevation and at the greatest distance from the pump 8, is emptied more slowly than the pool 2 owing to the greater lift of liquid from the pool 5 and the greater resistance offered by the branch line 6 and suction line 7, as compared to the resistance offered to liquid originating in the pool 2. Accordingly, when the pool 2 becomes empty, air is admitted into the entire pumping system and the suction at the pools 3, 4 and 5 is materially lessened if not entirely lost. By providing the valves 9 in the several branch lines 6, any branch line 6 is closed as soon as air is admitted to the associated valve, thereby permitting the entire suction of the pump 8 to be applied to the pool or pools which still contain liquid. As soon as the pool is again filled with liquid, associated valve 9 is opened.

Figure 4:
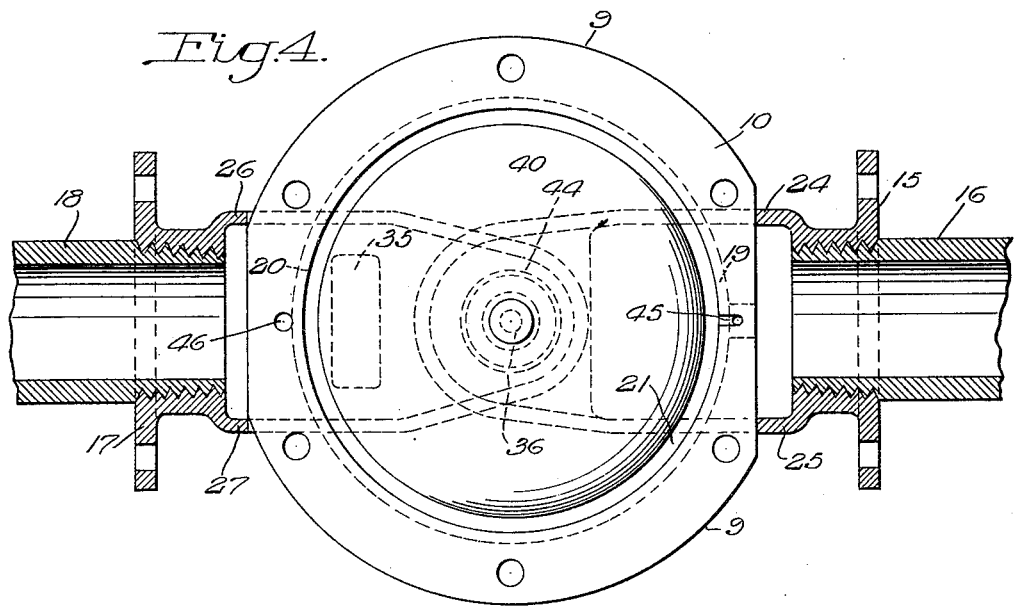
Figure 4 is a plan view, partially in section, of the valve taken along the section line IV—IV of Figure 2.
Figure 2:
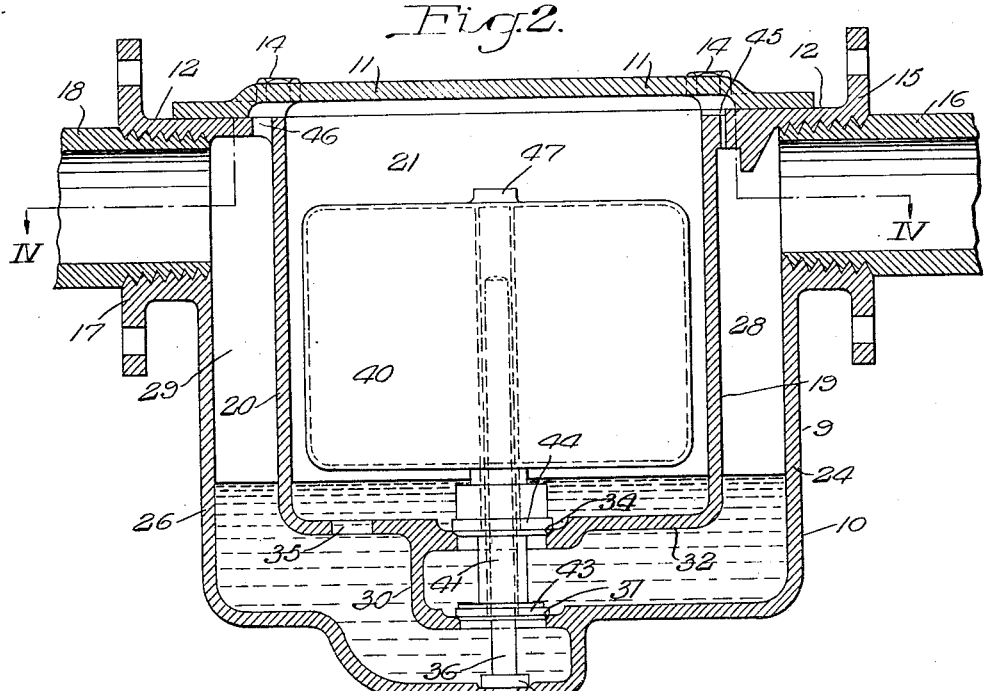
Figure 2 is a sectional view of a suction control valve embodying my invention in its closed position.
Figure 3:
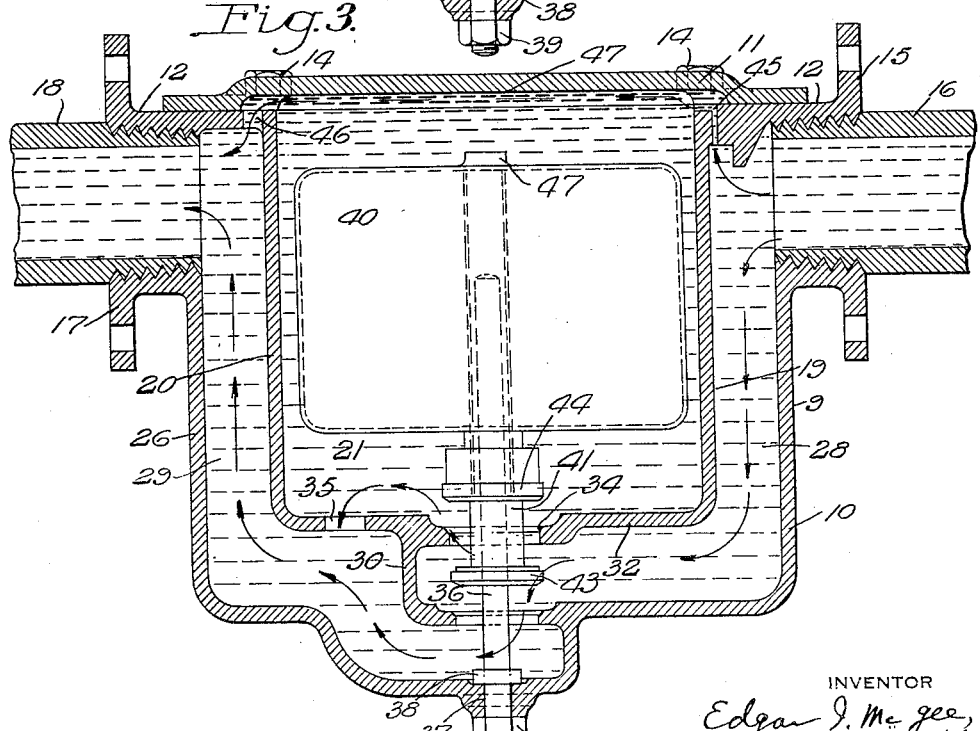
Figure 3 is a similar view of the valve in its open position.

Referring to Figures 2, 3 and 4, each valve 9 comprises a casing 10 of substantially cylindrical outline, which is provided with a cover 11 secured to a seat 12 by bolts 14; a flanged connection portion 15 for the reception of a pipe line 16 leading to the associated pool or sump; and a similar connection 17 for the reception of a pipe 18 connected to the pump 8. The pipes 16 and 18 constitute portions of one of the branch lines 6.

By providing both flanges and threads on the connecting portions 15 and 17, different types of pipes may be connected to the valve. The valve 9 is preferably constructed of acid resisting material, such as bronze, so that the valve may be used with acid bearing liquids such as are found in mines and in certain industrial establishments.

The interior of the casing 10 is provided with arcuate partition walls 19 and 20 which, together with portions of the outer wall of the casing, constitute a cylindrical float chamber 21. The top of the chamber 21 is closed by the cover 11. Vertically extending side walls 24—25, and 26—27, cooperate with the arcuate walls 19 and 20, respectively, for defining passageways 28 and 29, leading from the connections 15 and 17, respectively, at the upper part of the valve, to substantially the bottom thereof. A partition wall 30 separates the passageways 28 and 29, and is provided with a horizontally extending valve seat 31. The tops of the passageways 28 and 29 are closed at the bottom of the float chamber 21 by a wall 32, in which a valve seat 34 is disposed in alignment with the valve seat 31.

The wall 32 is also provided with a port 35, communicating between the float chamber 21 and the passageway 29. A rod or guide 36 extends upwardly through an opening 37 in the bottom of the casing 10, the valve seat 31 and the valve seat 34 for a considerable distance into the float chamber 21. Clamping nuts 38 and 39 are provided for clamping the rod 36 in place.

The float 40 is slidably mounted on the rod 36 for vertical movement therealong. A sleeve 41 depending from the float 40 and movable therewith, carries a valve 43 cooperating with the valve seat 31 and a valve 44 cooperating with the valve seat 34. The valve seat 34 and the valve 44 are made slightly larger than the valve seat 31 and valve 43 so that the valve 43 can pass through the valve seat 34 during the assembly of the valve structure, and to provide for closing the valve seats, as hereinafter described.

A duct 45 of relatively small cross-sectional area is connected between the tops of the float chamber 21 and the passageway 28. A second duct 46, of slightly larger cross-sectional area than the duct 45, is connected between the tops of the float chamber 21 and the passageway 29. The ducts 45 and 46 are unobstructed in order to provide a continuous passageway between the top of the passageway 28 and the top of the passageway 29 through the float chamber 21.

In the operation of the valve, and with the parts in the closed position shown in Figure 2, suction applied to the valve from the pipe line 18 serves to keep the valve 43 in engagement with the seat 31. This suction also removes any liquid from the float chamber 21 through the port 35 until the liquid reaches a level at substantially the bottom of the float 40, as controlled by the passage of air through the port 35. The air is also drawn directly from the pipe 16, through the duct 45, the float chamber 21, and the duct 46, to the pipe 18.

The cross-sectional area of the duct 45 is so small that the amount of air drawn into the system through the valve 9 does not materially affect the efficiency of the entire pumping system. So long as air is admitted to the float chamber 21 through the duct 45, the valve remains in its closed position.

As soon as liquid in the associated pool or sump becomes deep enough to cover the end of the associated branch line 6 and thereby fill the pipe 16, the suction applied to the chamber 28 through the duct 45 causes liquid to be drawn upwardly to fill the passageway 28. As soon as the passageway 28 becomes filled with liquid, it is drawn over into the float chamber 21 through the duct 45. The accumulation of liquid in the float chamber 21 continues until its lifting effect on the float 40 is sufficient to overcome the weight of the float 40 and the valves 43 and 44 together with the suction pull exerted on the lower face of the valve 43 when the float 40 rises carrying with it the valves 43 and 44. The opening of the valves permits liquid to flow through the passageway 28, the valve seat 31, the passageway 29, and out through the pipe connection 17.

By providing the two valves 43 and 44 on the same sleeve with their outer faces relative to the passageway 28 disposed under substantially the same conditions of vacuum, the suction on the outer side of the valves when they are closing the passageway 28 is substantially balanced.

As the valves start to open, the downward pull of the liquid passing through the valve seat 31 into the passageway 29 is overcome in large part, by an upward flow of liquid through the valve seat 34 against the lower face of the valve 44. The liquid flowing into the valve chamber 21 escapes through the port 35 into the passageway 29. The float chamber 21 continues to fill until a knob 47 rises against the under surface of the cover 11, as shown in Figure 3. The float chamber 21 is eventually entirely filled with liquid when some of it follows a path through the ducts 45 and 46 across the float chamber 21. So long as the float chamber 21 remains filled with liquid, the valve remains open.

As soon as air is drawn into the valve through the pipe 16, it passes through the duct 45 into the top of the float chamber 21, where it is trapped. The liquid in the float chamber is drawn out through the port 35 as more air is collected in the float chamber, until the valve is closed, when the level of the liquid remaining in the float chamber 21 and the passageway 29 is determined by the suction head applied to the valve and by the position of the port 35. In general, the level of the liquid in the valve when it is in closed position is substantially at the bottom of the float.

The balancing of the float and valve to operate under different conditions of vacuum is important. The valve is called upon to operate under varying conditions of high and low vacuum. The float must be capable of lifting the valve off its seat against the highest vacuum any pump can develop.

With a valve having a free passageway of three square inches and a vacuum of 14.7 pounds per square inch, the total pull on the lower valve 43 is approximately 44 pounds. To overcome this force, a complicated system of levers or an exceptionally large float would be required unless having the balanced construction of the present valve.

The frequency of operation of the different valves can be timed if desired by their locations in the suction lines, and by the sizes of pipe used in the lines. If the sump is small and being constantly fed by a small incoming stream, the valve will operate frequently by being put comparatively close to the sump. The same result is had by using a small suction line between the valve and the sump. However, large or standard size suction lines are preferable, so that the valve can handle a larger amount of liquid if the incoming flow to the sump should increase. By placing the valve at a greater distance from the sump, the valve remains closed for longer periods while the air is being slowly exhausted from the branch line 6, through the ducts 45 and 46. When the valve does open, it remains open for a longer period, or until the sump is emptied and air again enters the valve. The slow cycle of operation saves wear on the valve parts and gives the pump a chance to create a higher vacuum to remove liquid from the lower and/or more distant sumps for a longer period of time.

While I have shown and described the present preferred embodiment of the invention, it is to be understood that it may be otherwise embodied within the spirit of the invention and the scope of the appended claims.

I claim:—

1. In a float valve, a float chamber, pressure and suction passageways connectible through a valve actuated by a float in said chamber, a second valve operable by said float for connecting the float chamber and the pressure passageway, and ports connecting said chamber to both said passageways.

2. In a float valve, a float chamber, pressure and suction ducts communicating through a valve, a float in said chamber for actuating said valve, and a second valve axially alined with the first valve and operated by said float for connecting the chamber to the pressure duct.

3. A float valve comprising a float chamber, a float therein and fluid supply and exhaust ducts connected through a valve operated by said float, said fluid supply duct being connected through a valve operated by said float to normally maintain the chamber full of liquid and the valves open.

4. The combination, in a float valve, with a float chamber and a float therein, of fluid supply and exhaust passages having connection through a valve actuated by said float, said supply passage also having communication with said chamber through a second valve actuated by said float and closed in the lower position of the latter.

5. In a valve, the combination with a float chamber and a float therein, of a passageway for fluid controlled by a valve actuated by the float, and a connection between the passageway and the chamber controlled by a second valve operated by the float and closed in the lower position of the latter.

6. In a valve, a float chamber, a float in said chamber, inlet and outlet passages, controlled by a valve on said float, a main port connecting the chamber to the inlet passage, a separate valve for said port actuated by said float and closed when the chamber is empty, and auxiliary inlet and outlet ports in said chamber.

7. A valve for controlling the flow of fluid in a passage including a valve member, a float chamber, a float therein for operating said member, a valve operated by said float for normally connecting the chamber to the passage, and ports connecting said chamber and said passage for initially filling the chamber with fluid and for by-passing a limited amount of air when the fluid level in said chamber falls.

In testimony whereof I have hereunto set my hand.

EDGAR I. McGEE.